April 9, 1940.  W. H. BROADFIELD  2,196,192
PROCESS FOR WELDING FERROUS METALS
Original Filed April 28, 1936  3 Sheets-Sheet 1
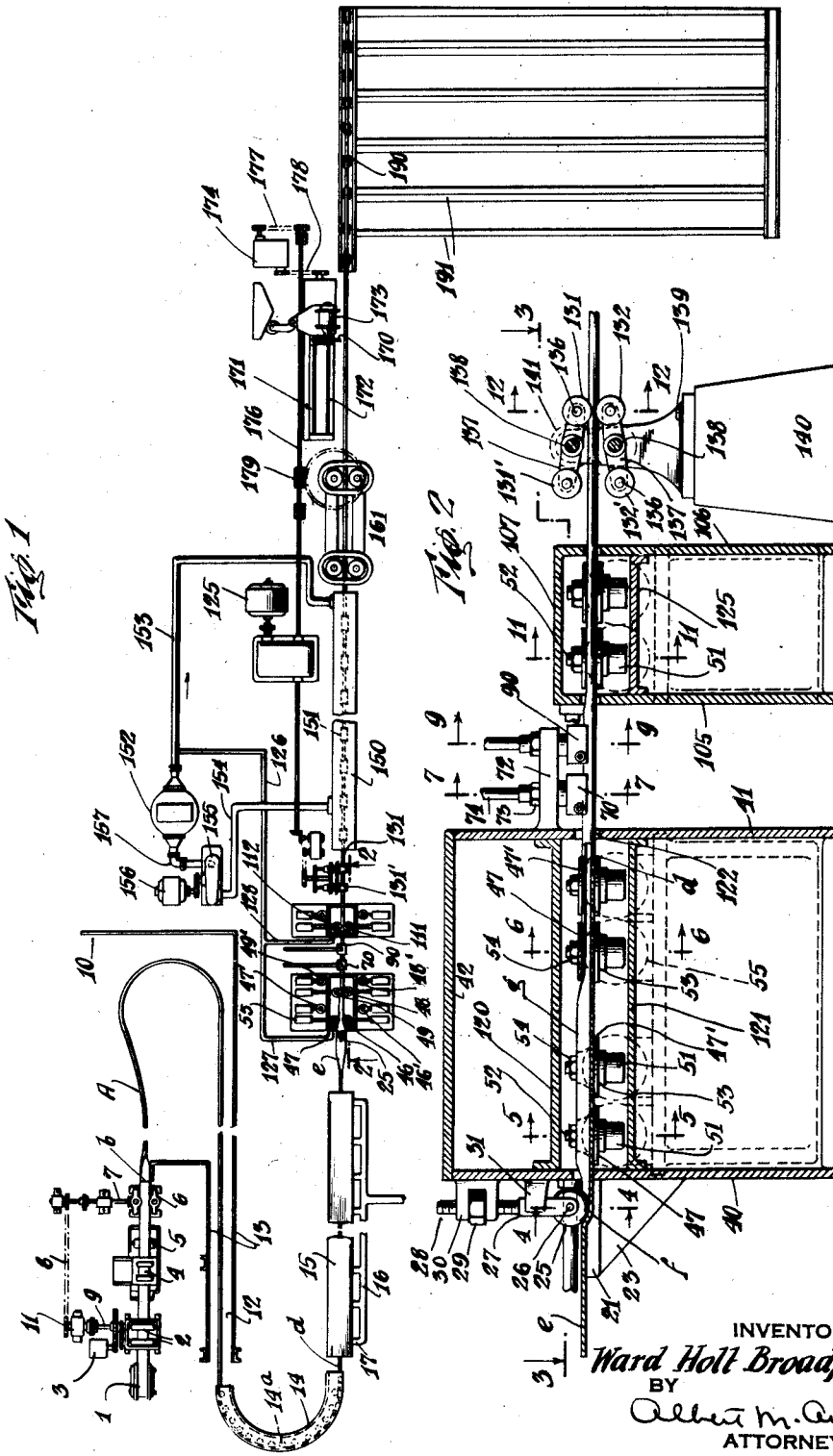
INVENTOR
Ward Holt Broadfield
BY
Albert M. Austin
ATTORNEY April 9, 1940.   W. H. BROADFIELD   2,196,192
PROCESS FOR WELDING FERROUS METALS
Original Filed April 28, 1936   3 Sheets-Sheet 2
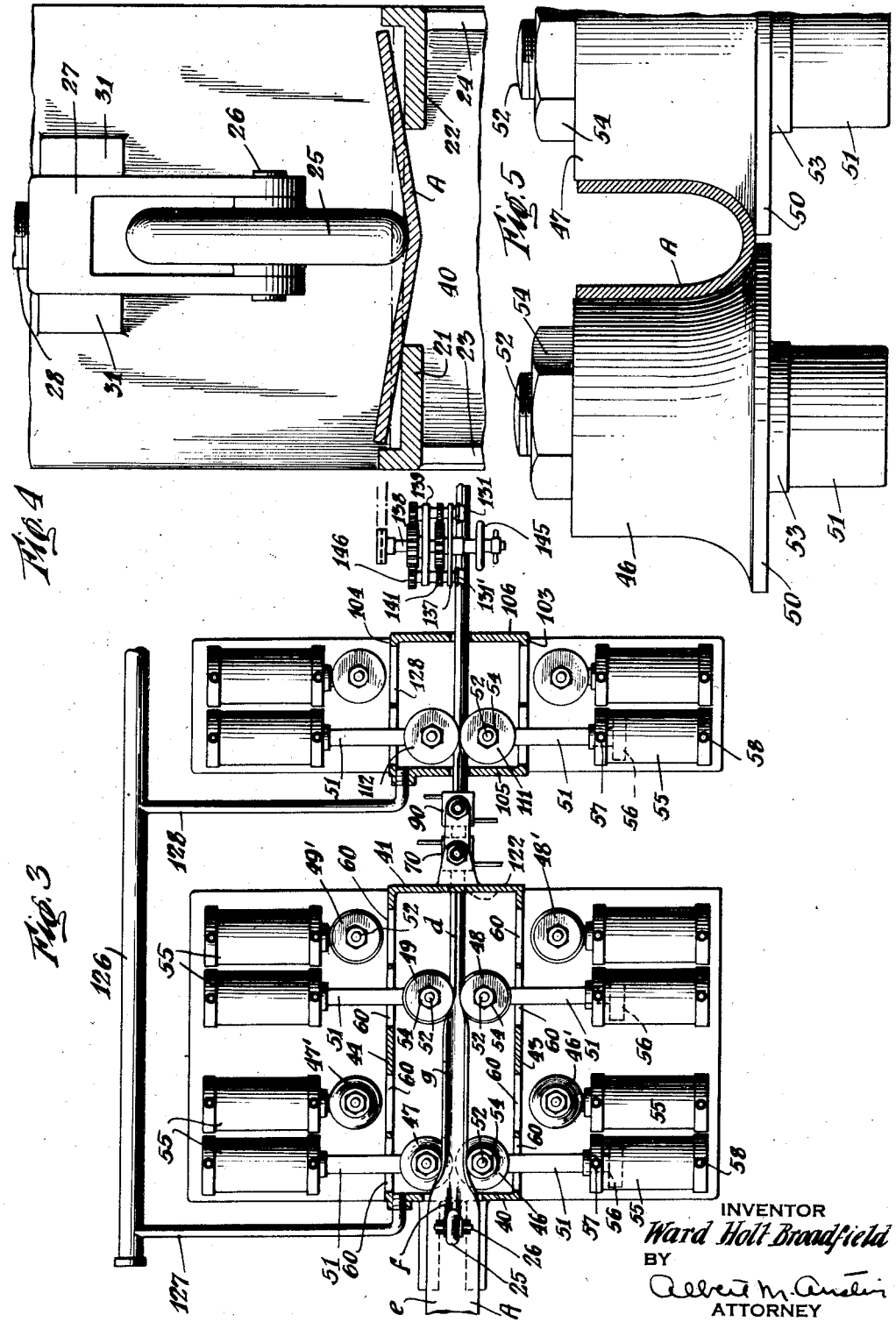
INVENTOR
*Ward Holt Broadfield*
BY
*Albert M. Austin*
ATTORNEY

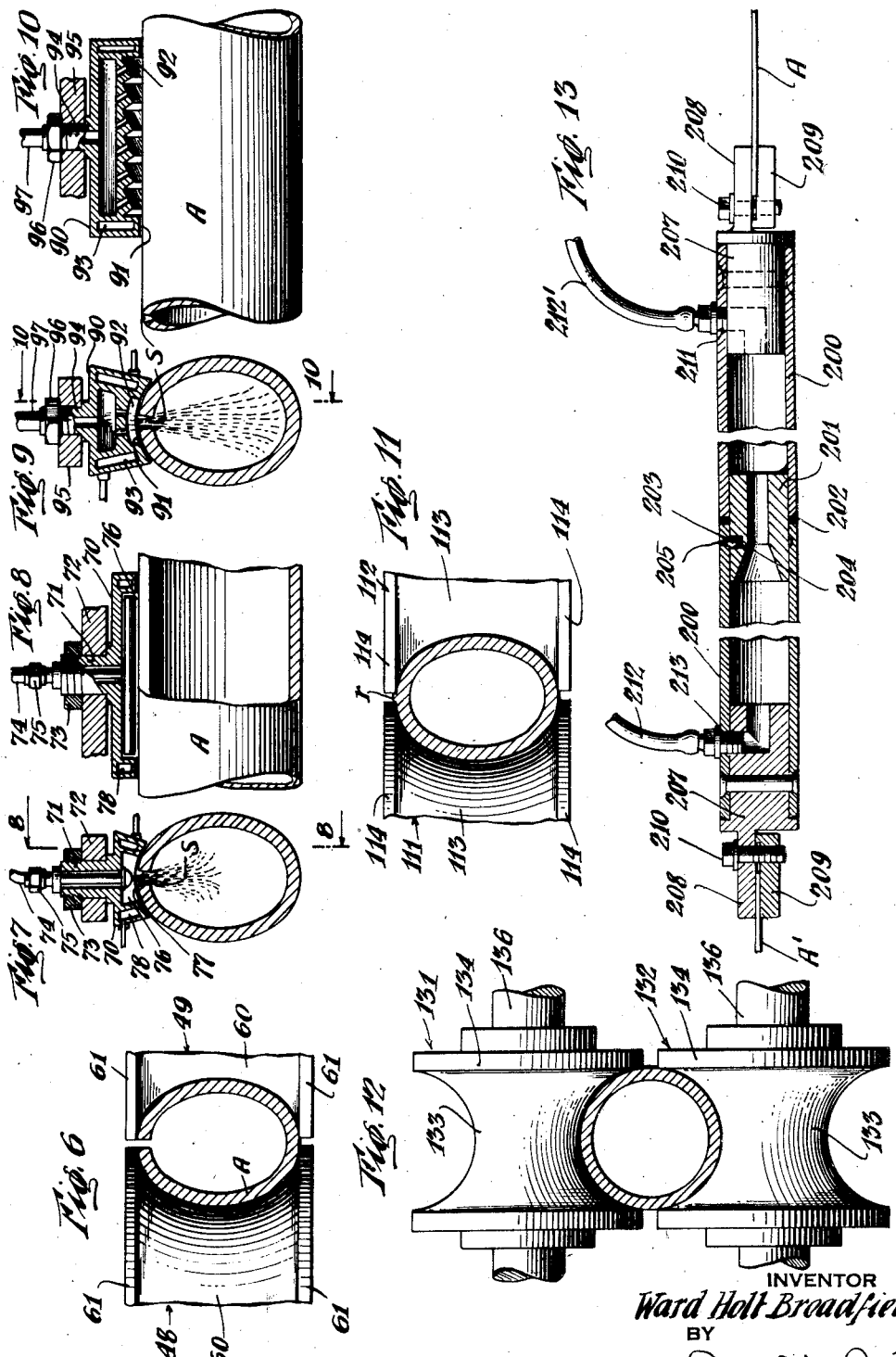

Patented Apr. 9, 1940

2,196,192

UNITED STATES PATENT OFFICE 2,196,192

PROCESS FOR WELDING FERROUS METALS

Ward Holt Broadfield, Scarsdale, N. Y., assignor to Broadfield Metals Corporation, Dover, Del., a corporation of Delaware Application April 28, 1936, Serial No. 76,757
Renewed December 18, 1939

5 Claims. (Cl. 113—112)

The present invention relates to an improved process for welding ferrous metals. This invention finds particular usefulness in the manufacture of pipe from a flat strip of sheet metal by continuous process.

In the manufacture of pipe as now practised ferrous plates or sheets are heated in a furnace to the required temperature for shaping. The plates or sheets are then curved or bent into the desired pipe or tube form by means of a series of shaping or forming bells or rolls. The bells or rolls draw the opposed edges of the sheet together to the point where the same may be pressed against one another when heated to a welding temperature. After the welding operation the pipe or tube passes between calibrating or sizing rolls to form the pipe to the shape and size desired.

It has heretofore been the practice to heat the edges of the ferrous sheet to a welding heat in a furnace and thereafter air or oxygen is permitted to contact, or is applied to, the edges of the skelp. This results in the formation of an oxide scale, very difficult to remove. Where the operation is performed in the presence of air or relatively pure oxygen it is difficult, if not impossible, to prevent the fusion of the iron and oxygen in such combination as to produce this undesirable oxide scale. The unremoved oxide scale remains buried in the pipe wall when the abutting edges of the skelp are pressed together to form the butt weld. The oxide scale thus buried in the completed pipe at or adjacent to the seam weld results in a seam of weakness running the length of the pipe. It is well known that seam-welded pipe invariably bursts at or adjacent to the seam weld caused by the imperfect welding of the abutting ends of the skelp from which the pipe is formed, since the presence of oxide scale prevents the formation of a homogeneous and autogenous bond between the abutting edges of metal.

Continuous seam welding of pipe as now practised is carried on with the greatest difficulty. A large amount of scrap and waste results by reason of the imperfect bonding and welding of the abutting edges of the shaped sheet. The finished pipe must be carefully inspected and tested. Large sections of the treated pipe must be removed as scrap because the seam weld is imperfect or the pipe otherwise fails to come up to the specifications required.

Under the present practice the pipe-making apparatus must be completely shut down and the furnaces cooled when pipe of another size or diameter is to be made or when shaping bells are to be repaired, removed or inserted. To thread the head end of a new strip of sheet metal through the furnace and shaping bells or rolls after a shutdown in an expensive, arduous and time consuming task. The furnace must be brought up to a certain heat and skilled workmen must hurry the strip through the furnace (which may be one hundred to several hundred feet long) before the strip becomes consumed and destroyed by remaining too long in the furnace. The strip must then be threaded through the shaping and forming rolls, the cooling equipment, and other apparatus, and finally connected to the draw bench which draws the pipe in process of formation through the apparatus. This threading operation requires experienced hands and it is difficult to perform because of the terrific heat under which, and the haste with which, the workmen must perform their task. Large quantities of scrap is the only product produced until the apparatus has all been adjusted and synchronized to the point where satisfactory pipe emerges.

An object of this invention is to provide an improved process for continuous welding of ferrous materials.

Another object of this invention is to provide an improved process for manufacturing ferrous pipe by continuous process, which is more economical and more flexible than processes heretofore used, and which is adapted to a wider range of usefulness than any of the processes heretofore known.

A further object of this invention is to provide an improved process for manufacturing pipe by continuous process which produces a superior grade of pipe at less cost than the pipe produced by the process and apparatus heretofore known.

Another object of this invention is to provide a process for manufacturing pipe which can be performed at high speed, which requires less skill and handling to execute, which is more positive in operation, and can be carried out with small scrap loss.

Still another object of this invention is to provide means by which a strip of metal may be threaded through the apparatus after a shutdown quickly, effectively and efficiently with little or no scrap or waste resulting.

Other objects of this invention will become apparent as the disclosure proceeds.

In accordance with this invention a continuous strip of pipe-forming metal is fed through a suitable furnace where it is heated to the required shaping and forming temperature. Two sets of forming bells or rolls are provided. While one set of forming bells or rolls are in service the other set is withdrawn from contact with the pipe-forming skelp and out of service, so that they can be repaired, cleaned, or replaced by new rolls when worn or when a change in pipe size is to be made. When desired the repaired or new rolls may be moved into service to shape the pipe and the other set of forming rolls retracted without halting or slowing up production. Thus it is seen that production can go on continuously even though worn rolls must be repaired or cleaned or when replacements are necessary in order that another shape or size of pipe may be formed.

When the pipe-forming strip has thus been shaped into tubular form with the edges of the strip bent into adjacent relationship, the edges are given a treatment to cause the formation of a type of scale which can be quickly, easily and completely removed when the adjacent edges are subjected to a reducing atmosphere.

In accordance with this invention, oxygen mixed with other substances is used in such a manner as to substantially avoid the formation of such oxide scale which is difficult to remove. It has been found that when the oxygen is diluted with other substances, the formation of the difficult oxide scale substantially disappears. In one form of carrying out this process, water or steam is introduced into the oxygen stream whereby the oxygen becomes diluted without impairing the ability of the oxygen to give the edges of the metal an adequate welding temperature. Any scale which is formed will thus contain a hydrogen component obtained from the water of steam, producing a hydroxide scale which can be easily removed by the application of a neutralizing or reducing atmosphere to be presently described.

In place of diluting the oxygen with water or steam, compressed air or nitrogen may be introduced into the jet of oxygen. Care must be taken to avoid explosion if hydrogen gas is to be introduced into the jet of oxygen. The ordinary forms of industrial oxygen, which is not pure and which contains approximately 80% or more of oxygen, may also be employed.

After the oxygen application has been completed, as hereinbefore stated, it is advantageous to subject the heated metal to a neutral atmosphere and then to a reducing gas or atmosphere, which occurs immediately after the application of the heating oxygen. The purpose of subjecting the heated metal to the reducing atmosphere is to prevent the permanent oxidation of the iron, resulting in the formation of iron oxide scale. The edges of the heated skelp are pressed together to effect a homogeneous bond or weld by suitable sets of rolls. This operation is also preferably performed in the presence of the reducing atmosphere. At the moment of welding the metal should have a temperature most effective for satisfactory welding. The pipe then passes through a set of shaping and sizing rolls to give the pipe the desired shape and size. Two sets of sizing rolls are provided so that while one set is in operation the other set can be repaired, cleaned, or replaced with a new set of rolls of the same or different size. Production is thus continued without interruption.

A suitable cooling system is provided for gradually cooling the heated pipe. The cooling of the pipe may be effected by the temperature-controlled application of gases such as nitrogen. The pipe-forming strip is drawn continuously through the furnace and forming apparatus by a suitable drawing mechanism such as a draw bench. A traveling saw is provided to shear off pipe sections of any desired length, which are thereafter piled in a suitable rack.

Before the apparatus is shut down after the completion of a desired run of pipe, a dummy pipe or needle formed of heat-resisting metal is attached to the tail end of the strip as it moves through the apparatus until the head end of the needle is gripped by the draw bench. The needle is made of such material that it is not affected or damaged by the heat of the furnace when at operating temperatures. Preferably means are provided for running a cooling medium, such as water, through the needle. The needle remains threaded through the furnace and the various treating, welding, cooling and other operating devices, until pipe manufacturing operations are to be resumed. The head end of the pipe-forming strip is then attached to the tail end of the needle projecting outside of the entrance end of the furnace. The furnace is brought up to a pipe-forming heat, the draw bench is put into operation, and the needle with the strip thereto attached is drawn through the apparatus. When the draw bench has taken hold of the head end of the formed pipe, the needle is disconnected therefrom and production is under way. The needle can be made into sections which can be easily disconnected and connected, to facilitate handling.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which:

Fig. 1 is a plan view of the complete apparatus for forming and making pipe by continuous process;

Fig. 2 is an enlarged cross-sectional view of the apparatus taken along line 2—2 of Fig. 1, this view showing the heated strip in the process of being shaped into tubular form and the abutting edges welded together, said operations all being performed by continuous process;

Fig. 3 is a horizontal cross-sectional view of the apparatus shown in Fig. 2, this view being taken on line 3—3 of Fig. 2;

Fig. 4 is an enlarged transverse cross-sectional view through the apparatus taken on line 4—4 of Fig. 2, this view showing the forming wheel used to initially bend the flat pipe-forming strip;

Fig. 5 is an enlarged transverse cross-sectional view through the forming rolls which perform the second bending operation, this view being taken on line 5—5 of Fig. 2;

Fig. 6 is an enlarged fragmentary cross-sectional view through the apparatus, taken along line 6—6 of Fig. 2, this view showing the heated strip passing through another set of forming rolls where the strip receives a further bending and forming treatment;

Fig. 7 is an enlarged fragmentary cross-sectional view of a spray device which treats the spaced edges of the shaped strip prior to pressing the adjacent edges of the strip together to form a homogeneous butt weld, this view being taken along line 7—7 of Fig. 2;

Fig. 8 is a fragmentary longitudinal cross-sectional view through the spraying device shown in Fig. 7, this view being taken along line 8—8 of Fig. 7;

Fig. 9 is an enlarged fragmentary transverse cross-sectional view of the applicator used in applying a reducing atmosphere to the adjacent edges of the pipe-forming strip;

Fig. 10 is an enlarged fragmentary longitudinal cross-sectional view through the reducing atmosphere applicator, this view being taken on line 10—10 of Fig. 9;

Fig. 11 is an enlarged transverse cross-sectional view through a pair of shaping and pressure rolls which operate to further shape the strip and press the heated and treated edges of the strip into a strong and homogeneous butt weld, this view being taken on line 11—11 of Fig. 2;

Fig. 12 is an enlarged view of the shaping and calibrating rolls which give the welded tube the desired cross-sectional form and size, this view being taken on line 12—12 of Fig. 2; and Fig. 13 is an enlarged cross-sectional view of a threader device which includes a dummy pipe or needle which may be threaded through the furnace and the pipe-forming and welding devices when manufacturing operations are halted, the needle thereafter providing a means to which the head end of the pipe-forming strip can be attached and drawn through the apparatus when manufacturing operations are resumed.

Similar reference characters refer to similar parts throughout the several views of the drawings and specification.

My improved process and apparatus is particularly useful and advantageous in the forming of pipe from a continuous strip of sheet metal by shaping the strip in tubular form and pressure-welding the edges of the strip together to form a homogeneous butt weld. It is understood, however, that my weld-forming process and devices may also be used for welding ferrous metals of any type or form into either a lap or butt weld, and accordingly it will be understood that this invention is not limited to the formation of pipe alone. My process and apparatus, however, is admirably adapted for the manufacture of seam-welded pipe from a small fraction of an inch in diameter up to four or more inches in diameter. In order to better understand the invention the process and apparatus will now be more particularly described in connection with the manufacture of ferrous pipe, although it is understood that certain features of the process and apparatus, as will be hereinafter pointed out, can be used in other lines of manufacture or in the performance of other operations than the manufacture of pipe.

There is shown for purposes of illustration, in Fig. 1, an apparatus for manufacturing pipe by continuous process, although other apparatus than that specifically shown in Fig. 1 may be used to carry out the process, without departing from the spirit of this invention. The metal strip from which the pipe is formed is applied to the apparatus from a suitable reel 1. It is desirable to feed the strip through the apparatus in a continuous ribbon. To make this possible, it is desirable to provide an end-welding apparatus by which the tail end of one strip section can be welded to the head end of a second strip section.

As shown in Fig. 1, pinch rolls 2 are provided to draw the strip section off the reel 1, a suitable source of power, such as the motor 3, and appropriate transmission mechanism being provided to drive the pinch rolls 2. The strip section moves through an end-welder 4, of well known form, which can be quickly operated to weld the tail end of one strip section and the head end of another strip section together to form a continuous ribbon. Suitable cleaning devices, such as scrubbing brushes, or grinding, abrading, or polishing wheels 6, are mounted on each side of the strip to thoroughly clean the edges of the strip so that the cleaned metal is exposed at the edges which are to be butt-welded together. The cleaning wheels 6 are operably connected to and driven by a suitable shaft 7 connected to a link belt 8 or other means, which is connected to the shaft 9, which shaft is operatively associated with the pinch rolls 2. The mechanism is so arranged that the pinch rolls 2 and the cleaning wheels 6 may be operated simultaneously to advance the strip at the proper speed and to thoroughly clean the edges thereof.

The strip moves into a suitable housing 10 where it forms into a loop or loops of considerable length. These loops permit the strip to run continuously and at a uniform rate of speed through the heating furnace 15 when the supply end of the strip is halted to form an end-weld. A suitable control device 11 is provided to control the speed of the motor 3 and the movement of the strip sections through the end-welder 4. When one reel 1 has been emptied of its strip section, the tail end of said strip section is halted in proper position within the end-welder 4. Another reel 1 carrying the second strip section is then placed in position, threaded through the pinch rolls 2 and the head end thereof moved into proper position within the end-welder 4, so that the end-welder 4 may perform a satisfactory end-welding operation, whereby the tail end of the first strip section is welded to the head end of the second strip section along the weld b. The pinch rolls 2 normally run the strip section at a greater speed than the movement of the strip through the heating furnace 15, so that a supply of continuous strip in loop form may be provided to supply the furnace when the tail end of one strip section is halted so that an end-weld can be made. A guide roller or rollers 5 may be povided to firmly hold the strip sections while the end-weld is being made and also to hold the strip in flat form to prevent buckling thereof and to guide the strip into position between the cleaning wheels 6.

The strip sections move out through the housing 10 through a suitable feed tunnel 12, formed by the side wall members 13. A suitable guide 14 is provided to direct the strip from the tunnel 12 into the furnace 15. The guides 14 may be provided with a series of rollers 14a which press against the strip to provide a carrier for the strip.

The heating furnace 15 may be of any well known form used in the industry for heating strip metal stock. Either coal, gas, oil, or electrical energy or other heating medium may be used. For the purpose of illustration only, there is shown in Fig. 1 a gas-type furnace having a plurality of gas jets or burners 17 supplied with gas from a gas main 18 through the connecting line 16. The furnace is so constructed and is of such length that the cold strip metal entering the furnace at the point d will be heated to the proper bending, forming and welding temperature as it leaves the furnace at the point e. The length of the furnace and the number and arrangement of the burners needed will depending upon the production speed desired. By providing a furnace with a sufficient number of burners, the strip can be formed, welded and made into high-grade pipe at a speed of from 50 to 500 feet per minute. Thus it is seen that the type and size of the furnace required will depend on the speed of production desired and the available heating material which is to be used. It is important that the heating furnace be so constructed as to raise the temperature of the strip passing continuously through the furnace to a red heat so that the strip or skelp can be properly shaped into tubular form and the free edges later treated and pressed together to form a homogeneous seam-weld. To accomplish this result at a production speed of 200 feet per minute may require a furnace 200 to 300 feet long, depending upon the number of burners, the heating material used, and the general construction of the furnace.

As the strip leaves the first furnace it is given an initial bending as it passes under a bending wheel 25, as shown more particularly in Figs. 2 and 4. An anvil support comprising the spaced shelves 21 and 22 carried by the bracket legs 23 and 24 respectively supports the side edges of the strip so as to leave the center portion of the strip free to be buckled downwardly by the wheel 25. The brackets 23 and 24 are preferably adjustable so that they can be spaced different distances apart to accommodate strips of various widths. For purposes of illustration only, the brackets 23 and 24 are shown mounted on the side wall 40 of a cabinet which houses the shaping and forming rolls. The wheel 25 is rotatably mounted on a suitable axle 26 carried by a yoke member 27. A threaded stud element 28 projects upwardly from the yoke member 27 and carries an adjusting nut 29 positioned between the arms of a bracket 30 through which the threaded stud element 28 extends. A holding bracket 31 engages the yoke member 27 to hold the wheel 25 steady and in fixed position during operation. The brackets 30 and 31 may be connected to a suitable support such as the wall 40 of the roll-containing cabinet. Thus it is seen that by manipulating the nut 29 the pressure of the bending wheel 25 against the heated strip A may be regulated and controlled so as to give the strip the desired bent or trough-shaped form. The rim of the bending wheel 25, as shown more particularly in Fig. 4, is so shaped as to give the desired contour to the strip metal at the bend point. Normally the apparatus is set up to form pipe having a limited diametrical range of sizes, say, pipe of 3 to 4 inches in diameter. When thus used a wheel 25 of such form and size is selected as will take care of this diameter range. However, if pipe of a wide diametrical range is to be made on the same apparatus, it may be desirable to provide a second wheel (not shown) to take care of smaller or larger pipe, which wheel can be mounted in the manner above described, and dropped into position when the change in pipe size is made, without interfering with continuous production.

As soon as the strip has received the initial bending at the point f, the strip or heated skelp passes into the cabinet which houses the forming and shaping rolls. Referring more particularly to Figs. 2, 3 and 5, a set of initial forming and shaping rolls, 46 and 47 are provided, which shape the heated skelp to a generally U-shaped form. The shaping rolls 46 and 47 are positioned on opposite sides of the skelp and are generally bell-shaped to give the skelp the desired U-shaped contour. Each of the rolls 46 and 47 is rotatably mounted upon a stud element 52 carried on an adjustable arm 51. The rim end 51 of the roll is rotatably supported upon a suitable collar or bearing 53 formed on the arm 51, and a nut 54 or other means threaded onto the free end of the stud 52 retains the forming roll in proper position. The arm 51 extends into a compression cylinder 55 and is connected to a suitable piston 56. Compressed air or steam is admitted into each cylinder through a control valve 57 and may be ejected through a suitable release valve 58. By admitting air, steam or other source of power into the cylinder 55, it is seen that the shaping rolls 46 and 47 can be adjustably held in the proper skelp-shaping position. It is understood that other means than that specifically here shown and described may be used for adjustably retaining the shaping rolls 46 and 47 in operative position.

The shaping rolls 46 and 47 are generally under great strain when in operation since they are required to bend and shape the skelp heated to red heat at the rate of 50 feet per minute and upward. While the bells or forming rolls 46 and 47 are sturdily constructed of heat-resistant metal, such as chrome steel, they occasionally become coated with foreign material or require repair or adjustment.

To permit cleaning, repair, adjustment or replacement of the forming rolls without halting or slowing up production, there is provided a second set of forming and shaping rolls 46' and 47' which may be brought into operation in a position adjacent to the forming rolls 46 and 47. The second set of forming and shaping rolls 46' and 47' may be mounted, operated and constructed similar to that described above in connection with the forming rolls 46 and 47. Thus the second or auxiliary rolls 46' and 47' are at all times kept in good working condition and ready to be immediately moved into operative position should the rolls 46 and 47 need cleaning, repair, replacement or adjustment. Furthermore, when pipe of different size is to be made auxiliary rolls 46' and 47' may be placed in position on the auxiliary mountings and can then be moved into position to give the new pipe size the required U-shaped form without halting production. When the auxiliary rolls 46' and 47' have been brought into the proper operating position and are in working contact with the skelp, the rolls 46 and 47 are retracted as by opening the valve 58 to release the pressure on driving the piston 56 and by forcing air or steam into the opposite end of the cylinder through the valve 57. The rolls 46 and 47 can then be cleaned, repaired, adjusted or replaced by the same size rolls or by other rolls as production requires. Thus production continues without interruption.

As soon as the skelp has been shaped into U-form at the point g, the skelp passes through another set of shaping and forming rolls which gives the skelp a generally rotund or tubular form. As shown more particularly in Figs. 2, 3 and 6, the second set of forming rolls 48 and 49, positioned on opposite sides of the skelp, have a generally spool-shaped form, each comprising the concave body portion 60 and raised rim portions 61. It is understood, however, that the spool-shaped rolls 48 and 49 should be so shaped that they cooperate together to give the skelp the desired tubular form. The mounting for the spool rolls 48 and 49 may be the same as the mounting for the bell rolls 46 and 47 heretofore described. Thus spool-shaped rolls 48 and 49 may each be rotatably mounted on a spindle 52 projecting from the arm 51 and are rotatably supported on a suitable collar or bearing 53 and are held in position upon the spindle 52 by suitable means such as a nut 54.

To permit continuous production while the spool rolls 48 and 49 are cleaned or undergoing repair or replacement with the same size or different-sized rolls, a second set of auxiliary rolls 48' and 49' are provided. The auxiliary rolls 48' and 49' are similar to the rolls 48 and 49 and are positioned adjacent thereto so that they may be brought into operative contact with the skelp at any time when conditions require. The mounting of the auxiliary rolls 48' and 49' may be the same as that provided for the rolls 48 and 49 and are brought into operation when conditions mentioned in connection with the auxiliary bell rolls 46' and 47' arise. The shaping and forming rolls above described and comprising the bell-shaped rolls 46 and 47 and their auxiliary rolls 46' and 47' and the spool-shaped rolls 48 and 49 and their auxiliary rolls 48' and 49', are contained in a suitable housing for a purpose hereinafter described, said rolls being inserted and retracted from the housing through suitable openings or apertures 60.

When the skelp has been given a generally tubular form as at the point $d$, the adjacent edges of the skelp about to be butt-welded together are given a treatment to prepare the edges for welding. This treatment forms an important feature of my invention. It is well known that when ferrous metal heated to red heat is permitted to cool, and in cooling come in contact with pure oxygen or air containing oxygen for even a short interval of time, oxide scale forms on the ferrous metal. This scale is generally known to the trade as oxide of iron, possessing characteristics which make it very difficult, if not impossible to remove effectively and economically. This scale is harder than the ferrous metal itself, is stable in form and is not susceptible to attack by any known chemicals which could be economically or successfully used in pipe production. In the manufacture of seam-welded pipe by known processes, attempt is made to form and shape the heated strip and to press the edges of the thus formed tubular strip or skelp together in the quickest time possible, so as to reduce the amount of oxide scale which has an opportunity to form on the heated skelp, to the lowest quantity. While the amount of oxide scale which may form is to a large extent determined by the time interval required to shape the skelp and press the edges together into a butt-weld after the skelp leaves the furnace, the formation of such oxide scale has never been completely eliminated by known processes. The oxide scale which has formed on the edges of the skelp prior to pressing the edges into welding contact, becomes buried as oxide of iron particles at the weld point or adjacent thereto. Oxide scale buried in the pipe wall at or adjacent to the seam forms a line of weakness at or adjacent the seam which materially reduces the service-ability and the strength of the completed pipe.

In accordance with my invention, oxygen mixed with other substances is applied to the adjacent edges of the skelp to be bonded in such a manner as to substantially avoid the formation of such oxide of iron scale or similar scale which is difficult to remove. It has been found that when the oxygen is diluted with other substances, a scale may be formed which can be easily removed as by passing the metal through a reducing atmosphere.

In the preferred form of carrying out my process, water or steam is introduced into the oxygen stream whereby the oxygen becomes diluted without impairing the ability of the oxygen by chemical action to raise the edges of the ferrous metal to an adequate welding temperature. Any scale which is formed will contain a hydrogen component obtained from the water or steam, producing a soft, easily removable hydroxide scale which can readily be removed by the application of a reducing atmosphere. In place of diluting the oxygen with water or steam nitrogen gas may be introduced into the jet of oxygen. Compressed air can be used but generally produces inferior results. The ordinary form of industrial oxygen, which is not pure and which contains approximately 80% or more of oxygen, may also be employed. Such commerical oxygen may be obtained as a by-product of nitrogen manufacture and can be obtained for a fraction of the cost of commercial pure oxygen. Hydrogen gas can also be used with the oxygen but care must be used in applying the same to avoid explosion. A satisfactory mixture comprises approximately 92% oxygen and approximately 8% nitrogen and/or hydrogen gas and/or steam. A mixture comprising approximately 92% oxygen, approximately 6% hydrogen and approximately 2% nitrogen has given eminently satisfactory results for welding ordinary steel heated to a temperature of 1200° C. Preferably the combined components should contain from 80% to 95% oxygen and from 5% to 20% modifying components such as hydrogen and/or nitrogen and/or steam and/or water forming a modified oxide scale which may be easily removed or dissolved in a reducing atmosphere.

The oxygen mixture for producing the soft, easily removable scale may be applied by means of a suitable spray nozzle. As shown more particularly in Figs. 7 and 8, the oxygen applicator may comprise a shoe 70 which is shaped to fit snugly over the tubular-shaped skelp and substantially enclose the seam opening defined by the edges of the skelp about to be welded. The shoe 70 preferably extends lengthwise of the pipe from several inches to a foot or more, or a sufficient distance to permit the oxygen mixture to penetrate into the tubular skelp through the seam opening $s$ and to permit chemical reaction between the hard ferrous metal, the oxygen and its foreign component, such as steam, nitrogen or hydrogen mixed therewith to produce the desired soft, easily removable scale. The shoe 70 has a hollow neck portion 71 which extends through a suitable support 72, the neck portion 71 is threaded to receive a nut 73 which clamps the shoe 70 to its support 71. A suitable supply hose 74 having a coupling connection 75 with the hollow neck portion 71 supplies the oxygen mixture to the hollow chamber 76 within the shoe 70. The shoe 70 is provided with a rim portion 77 which is shaped to conform to the tubular contour of the skelp. Since the rim portion 77 of the shoe is relatively close to the hot pipe it may be desirable in certain instances to provide a cooling passage 78 within the rim through which a cooling medium, such as water, may be circulated.

The oxygen mixture contained within the chamber 76 of the shoe is forced by the pressure supplied through the feed line 74 through that portion of the open seam s which is housed within the shoe 70. Sufficient force is applied to the oxygen mixture to cause the mixture to be projected for some distance into the tubular skelp so that the inside surface of the tubular skelp adjacent to the open seam as well as the skelp edges and a portion of the outside surface of the tubular skelp adjacent the open seam, has an opportunity to combine with the ferrous meal so as to form the modified scale easily removable in a reducing atmosphere. Thus as the tubular skelp moves continuously under the shoe 70 the free edges and surrounding areas are treated with a blast of a mixture comprising oxygen and an oxygen-modifying component which heats the areas affected to a welding heat by chemical raction and which results also in the formation of a modified oxide scale which vanishes when subjected to a reducing temperature, leaving the pure metal exposed.

Almost immediately following the application of the modified oxygen component by means of the apparatus such as shown in Figs. 7 and 8, a reducing atmosphere is applied to the exposed edges and surrounding area of the tubular skelp. The purpose of subjecting the heated metal to the reducing atmosphere is to prevent the permanent oxidation of the iron or the formation of iron oxide scale and also to remove the reducible scale present. The reducing atmosphere may comprise a reducing gas such as hydrogen, carbon monoxide, or nitrogen mixed with sulphur, boric acid, silica acid, or the salts of silica or boric acids, or various other acids. The gas used may be any suitable reducing gas of which carbon monoxide and hydrogen may be considered preferable on account of their easy application. However, nitrogen mixed with a gas oil to which a small amount of sulphur or waterglass is added, may be used, although some difficulty may be encountered in keeping the sulphur suspended in the oil. Other chemicals and materials having a reducing effect on the modified oxides of iron may also be used. The applicator for applying the reducing atmosphere is shown more particularly in Figs. 9 and 10 and comprises a shoe 90 having a rim portion 91 which seats closely adjacent to the tubular skelp and defines an enclosed chamber 92 which contains the inert gases. The rim portion 91 may be provided with a passage 93 adapted to contain a circulating cooling medium, such as water. The shoe 90 is provided with a hollow neck portion 94 which extends through a suitable bracket support 95 and is secured thereto by means of a nut 96 threaded over the threaded neck portion 94. A suitable feed line 97 connected to the hollow neck portion 94 supplies the reducing atmosphere to the shoe 90.

The shoe 90 is constructed and arranged to enclose a section of the tubular skelp adjacent the open seam s so that the reducing atmosphere contacts the edges of the skelp as well as the inside surface of the tubular skelp and portions of the outside surface adjacent to the open seam. To facilitate the projection of the reducing atmosphere, the shoe may be provided with a horizontal partition 98 having a plurality of passages 99 extending therethrough and connecting a storage chamber 100 in the upper part of the shoe with the open chamber 92 in the lower part of the shoe. Thus a positive and constant supply of reducing gas is forced against the inside of the skelp, the edges of the skelp, and the adjacent portions thereof.

The reducing atmosphere thus supplied acts to consume the modified oxide scale through chemical and/or physical reaction. Little or no evidence or residue is visible and the edges of the metal adjacent the open seam is substantially clean and free from foreign matter, with only the pure ferrous metal exposed, which has been heated by the modified oxygen reaction previously applied to a plastic or welding temperature. Approximately one liter of modified oxygen gas per linear foot of pipe and approximately $\frac{3}{10}$ of a liter of a reducing gas, such as carbon monoxide, is about the quantity required for ordinary pipe. The amount of gas will vary somewhat with the temperature of the pipe, the size of the pipe, and other factors.

It is highly desirable to provide a neutral zone or a short space between the modified oxygen applicator 70 and the reducing gas applicator 90 as shown in Figs. 2 and 3. This space or interval should be such that the modified oxygen material applied to the moving skelp has had an opportunity to combine with the ferrous metal to form the soft, easily removable modified oxide scale. The interval should be sufficiently short so that no opportunity is given to the outside air containing oxygen to combine with the ferrous metal to form the hard, undesirable oxide scale. It is difficult to fix the exact spacing between the modified oxygen applicator and the reducing gas applicator, but it should be sufficient, and only sufficient, for the modified oxygen material to perform its function and permit any free uncombined modified oxygen from escaping before the reducing gas is applied, since the reducing gas might otherwise react with the modified oxygen material to effect undesirable results on the metal. As a matter of general practice the space or interval between the modified oxygen applicator 70 and the reducing gas applicator 90 should be somewhere between one to 12 inches, depending upon the speed with which the skelp moves through the apparatus, the efficiency of the applicators, the freedom from leakage of the applicators, and other conditions. The most desired spacing within the range limits above recited for any particular apparatus and speed of production, can be determined by test and observation by those skilled in the art. By way of example, pipe has been made at the rate of 200 feet per minute using a modified oxygen injector 70 approximately 10 inches long, a neutral zone thereafter of approximately 2 inches followed by a reducing gas applicator 90 approximately 4 inches long. These injectors should be as close to the welding rolls as operations will permit. It is understood that the size of the injectors necessary will vary in accordance with the speed at which the skelp moves out of the furnace.

After leaving the reducing gas applicators 90 the treated tubular skelp moves into a second cabinet comprising the end walls 103 and 104, the side walls 105 and 106 and the top wall 107, within which is housed the cooperating pressure rolls 111 and 112 which press the free edges of the skelp together to form a homogeneous bond. The pressure rolls 111 and 112 have a spool-shaped contour comprising a concave body portion 113 and rim portions 114. The spool may be rotatably mounted on a stud element 52 carried by an arm 51 which is connected to a piston 56 which reciprocates in a cylinder 55. Extension and retraction of the compression rolls 111 and 112 may be effected by the admission and removal of steam or compressed air through the valve ports 57 and 58 positioned at each end of the cylinder. The pressure rolls may rest upon a suitable collar or bearing and may be held in place by a removable nut 54 threaded on the threaded end of stud elements 52. When the pressure rolls 111 and 112 are in operative position the free edges of the tubular skelp are pressed into firm contact so that the metal in semi-molten form will flow together and unite to form a homogeneous and autogenous bond at the point where the open seam existed.

Due to the fact that the metal is free or substantially free of obnoxious scale a perfect bond and joint results, which upon actual test has proven to be as strong as or stronger than the pipe wall at other points. By way of example, seam-welded pipe of a certain size made by present processes was tested and split at or along the seam when pressure of approximately 1100 lbs. to the square inch was applied. Seam-welded pipe made from the same material and of the same weight and the same diameter by the process herein described, was tested and withstood a pressure of over 4000 lbs. per square inch before giving way, and the pipe wall then gave way at points other than at or adjacent to the seam-weld. The effectiveness of my process for producing high-grade ferrous pipe and a strong and firm autogenous weld is thus demonstrated. The seam in my pipe is scarcely visible but when visible can be identified only by a slight ridge r on the pipe.

It is highly desirable that the bending and forming operations be performed as far as possible in an inert or reducing atmosphere, free from contact and beyond the reach of oxygen such as that contained in the air. In order to effect this result the shaping and forming operations are carried on in an inclosed cabinet or cabinets, as heretofore described. The bell-shaped rolls and spool-shaped rolls shown in Figs. 5 and 6, for example, are housed within one cabinet within which baffle plates 120 and 121 may be provided to retain the inert gas surrounded around the moving skelp. This cabinet may extend right up to the furnace 15 so as to also house and contain the bending wheel 25. As the skelp leaves this cabinet through the port 122 it passes almost immediately into the modified oxygen applicator 70, a sufficient neutral zone or space only being provided to permit the escape of surrounding neutral or reducing gases which might react unfavorably with the modified oxygen material applied through the applicator 90.

In the same manner the pressure rolls 111 and 112 are housed within the cabinet into which is injected a neutral or reducing atmosphere held surrounded around the moving skelp by the baffle plate 125 and the top wall of the cabinet 107. An adequate supply of neutral or reducing gas is supplied to each cabinet through the feed line 126 and the branch lines 127 and 128, shown more particularly in Figs. 1 and 3. Necessarily some of the metal preserving gas escapes from the cabinets, as through the roller admission openings 60 and 128. The loss of gas can be greatly reduced by providing suitable doors or shutters (not shown) for these openings. Sufficient metal preserving gas should be provided to surround the moving skelp and prevent outside air or oxygen from coming into direct contact therewith while the forming and welding operations are being performed.

The pipe is shaped and sized to the form and size desired by a pair of shaping and sizing rolls 131 and 132, shown more particularly in Figs. 2, 3 and 12. The shaping and sizing rolls mutually cooperate to give the pipe an accurate predetermined diameter and the desired circular or other predetermined cross-sectional shape. The body portion 133 of the shaping and sizing rolls have the desired concave contour to effect this desired result, and they are also provided with reinforcing and strengthening rims 134 around the edges thereof. Each shaping and sizing roll 131 and 132 may be rotatably mounted on a stud element 136 projecting from a lever arm 137 pivotally mounted on a suitable shaft 138 projecting from a standard 139 supported upon a suitable base 140. The rolls 131 and 132 are maintained in shaping and sizing contact with the moving skelp by means of a suitable pressure-applying device such as a ratchet and pinion mechanism 141 attached to the shaft 138, or by a strong spring or set screw devices, or other known adjustable holding means.

To permit production to continue when the shaping and sizing rolls 131 and 132 must be removed for cleaning, repairing, or replacement with the same size or other size rolls, I provide auxiliary shaping and forming rolls 131' and 132' mounted on the other end of the respective pivoted levers 137. The rolls 131' and 132' may be quickly swung into operative shaping and forming contact with the moving skelp by manipulating the hand wheel 145 which also withdraws the shaping, forming and sizing rolls 131 and 132 from operative contact with the moving skelp. Accurate adjustment of the rolls 131 and 132, 131' and 132', to effect the desired forming and shaping result, can be obtained by a simple manipulation of the setting device 146. It is understood that the forming and sizing rolls may otherwise be adjustably mounted so that a predetermined shaping and sizing pressure can be exerted on the moving skelp, and other means (such as that shown in connection with the forming rolls 46 and 47, 46' and 47') may be provided for moving the main rolls 131 and 132 and auxiliary rolls 131' and 132' into operative contact with the moving skelp so that production may continue without interruption.

Suitable cooling means is provided to gradually cool the heated skelp so that the finished pipe will possess the desired strength and toughness and the desired crystalline structure. I have shown for purposes of illustration a cooling tunnel 150 through which the hot pipe now passes. The pipe may be supported in the cooling tunnel upon suitable rollers 151. The cooling medium, preferably some inert gas, such as nitrogen, flows from the cooling container 152 through the supply line 153 and into the coolest end of the coooling tunnel 151. The cooling medium then flows through the cooling tunnel in the direction of the arrow shown in Fig. 1, picking up heat from the hot pipe. The cooling gas or medium escapes from the tunnel through the pipe 154, being drawn therefrom by means of the suction pump 155 driven by the motor 156. The suction pump forces the hot cooling gas into the cooling container 152 through the pipe line 157. The cooling container 152 may be of any well known form known to the art which functions to draw out and expel the heat from the cooling gas and supply the cool gas to the feed line 153.

Where inert or reducing gas, such as nitrogen, is used to cool the skelp in the process of being acted upon by the forming and shaping rolls, the supply line 126 may be directly connected to the cooler 152 or the supply line 153. Thus a single pumping and cooling unit may be used with considerable economy to supply the same neutralizing or reducing and cooling gas required in the different steps of the process. If desired the forming and sizing rolls 131 and 132, 131' and 132', may also be contained within a suitable cabinet which is supplied with an inert or reducing gas to prevent the oxygen in the air from attacking the ferrous metal and forming oxide scale on the pipe during manufacture. Thus it is seen that as the pipe emerges from the cooling tunnel 120 it may be kept substantially free from oxide scale deposits either on the outer surfaces of the pipe or buried in the body of the pipe wall along the seam joint.

The skelp and pipe in the process of formation may be drawn through the furnace, the forming and shaping rolls, the modified oxygen applicator, the reducing gas applicator, the pressure rolls, the forming and shaping rolls, and finally the cooling tunnel, by means of suitable apparatus, such as a continuous draw bench 161 of well known form. The draw bench is so constructed as to grip the cooled and finished pipe and draw the skelp ribbon through the apparatus at the desired rate of speed. The skelp is freely supported on the various shaping rolls and carrier rolls so that the speed of production can be controlled by changing but not varying the speed of the draw bench through well known control devices.

It is generally desirable to cut the continuous pipe into sections of predetermined length. For this purpose a traveling saw 170 adapted to cut the pipe transversely at any desired point, is provided. The saw 170 is mounted on a suitable carrier platform 171 which rides on the track 172. The saw is driven by a suitable motor 173 mounted on the platform 171. The saw platform rolls along a path longitudinal of the pipe and when in sawing position travels longitudinally at the same speed as the pipe. The longitudinal movement of the saw platform can be controlled by a suitable speed controlled power transmission device 174, which is driven by motor 175 connected to the shaft 176 through a suitable transmission belt or chain 177. The saw platform 171 may be opartively connected to the transmission device 174 through suitable gearing or chain belt drive 178 which drives the platform 171, as by rack and pinion transmission, along the track 172. A cam device 180 operates to move the saw into sawing contact with the moving pipe. The shaft 176 may be connected by suitable gearing 179 to the draw bench 161 so that the motor 175 operates to drive the draw bench and also moves the saw platform longitudinally in synchronism therewith. The shaft 174 may also be operatively connected to the shaping and sizing rolls 131 and 132, which are preferably driven in synchronism with the draw bench.

When the pipe has been cut into sections of desired length, it passes onto the carrier rolls 190 and a suitable dumping device (not shown) lifts the pipe off the rolls 190 and rolls them off onto an inclined rack comprising spaced bars 191. The rack may, if desired, be mounted on suitable wheels so that it can be trucked away when loaded with the desirable quantity of pipe.

When the plant is to be shut down after the desired run of pipe has been completed, a threading device which might well be termed a "needle" is attached to the tail end of the pipe-forming strip prior to its passage through the furnace 15. The needle, as shown in Fig. 13, may comprise a hollow tube of heat-resistant metal, such as chrome steel, which may be formed in one continuous piece but preferably is formed into separable sections 200. Since the cooling medium, such as water, is to be contained within the tube, it is desirable to have a substantially leak-tight joint between the sections. One form of joint which may be used comprises a tubular coupling 201 which extends into one section and may be welded thereto. The other end of the tubular coupling 201 extends into the adjacent end of the next section, forming a tight fit therewith. A gasket 202 is preferably provided between the ends of the pipe to form a substantially leak-tight joint. The sections may be removably locked together by means of a steel ball or projecting element 203 which fits within a receiving chamber within the coupling 201 and is urged upward as by a spring 204, so that it normally serves to lock the coupling 201 to the pipe wall within which it is inserted. A pin opening 205 may be provided through which an instrument may be inserted to depress the ball 203 and permit the sections to be separated. It will be noted that this form of connection permits the pipe sections to be slipped together so as to automatically lock, there being no projections around the wall of the needle to interfere with its movement through the apparatus.

The ends of the needle are preferably closed and sealed by a suitable block 207 welded or otherwise secured to the needle walls.

The head end of the needle is provided with a gripping device adapted to be detachably secured to the tail end of the strip A before it passes into the furnace 15. The gripping device may be variously constructed to obtain a firm grip on the tail end of the metal strip. By way of example, the gripping device may comprise a jaw 208 fixed to the head end of the needle and an adjustable jaw 209 connected to the jaw 208 as by an adjusting bolt 210. The tail end of the strip A prior to its entrance into the furnace 15 is firmly connected to and gripped by the cooperating jaws 208 and 209 so as to draw the needle through the apparatus. The tail end of the needle may be provided with similar gripping devices to grip the head end of a piece of skelp A' prior to starting up operations. When the needle is then drawn through the apparatus by the draw bench the strip A' will be drawn along with it.

Preferably the needle is of sufficient length when completely assembled to extend from the entrance of the furnace 15 to the draw bench 161. A suitable cooling medium, such as water, may be run through the hollow needle by injecting the same through the hose line 212 connected to a concealed nipple 211 provided in the needle wall. The cooling medium exits through the hose line 212' likewise connected to the concealed nipple 213. The cooling medium is run through the needle while the furnace is cooling off after a shutdown and during heating of the furnace prior to actual production. When operations are to commence the hose lines 212 and 212' are disconnected, permitting the needle to be drawn through the apparatus by the draw bench 161 without obstruction.

As the head end of the needle advances through the apparatus, the metal bending wheel 25 and all of the metal shaping rolls 46 and 47, 48 and 49, 111 and 112, are progressively retracted so as to avoid interference with the gripping device at the tail end of the strip. The modified oxygen applicator 70 and the reducing atmosphere applicator 90, as well as the shaping and sizing rolls 31 and 32, may also be retracted as the head end of the needle progressively advances through the apparatus. These retractions can be so timed that pipe can be formed within a very few feet of the tail end of the strip engaged by the gripping device attached to the needle. Very little scrap or waste thus results. When the head end of the needle has been drawn forward until the same is gripped and engaged by the draw bench 161, the draw bench motor 175 may be halted and operations terminated. Valves which control the flow of the neutral or reducing gases are manipulated to close off the flow of gas into the various operating devices.

When operations are to commence the furnace is brought up to the required metal heating temperature and all parts of the apparatus placed in first class operating condition. To protect the needle from injury while lying in the heating furnace, cooling water may be circulated through the needle which is admitted through pipe 212' and removed through the pipe 212 at the tail end of the needle which extends outside of the front end of the furnace. Thus the needle can be kept in first class condition in spite of the heat to which it is subjected in the furnace. The gripping device attached to the tail end of the needle is then firmly attached to the head end of the strip to be drawn through the furnace and pipe-shaping and forming devices. The draw bench is then thrown into operation and the needle is drawn through the furnace 15 and subsequent apparatus. The needle in its progress through the apparatus draws the head end of the strip progressively through the furnace and through the various shaping and forming rolls, modified oxygen projector, reducing atmosphere projector, shaping and sizing rolls, and cooling tunnel. The various shaping and forming rolls are progressively moved into position as the head end of the strip arrives at the location thereof, so that when the completed strip has been drawn through the entire apparatus and gripped by the draw bench, a very few feet only of the strip need be removed as scrap. The needle can then be disconnected into sections and returned to the furnace end of the shop ready for re-use when the apparatus is to again be shut down. Since the apparatus measured from the head end of the furnace to the draw bench may be several hundred feet long, it is desirable to form the needle in quickly detachable and attachable sections so as to permit easy handling thereof.

A threading needle is a great time saver and greatly reduces the amount of waste scrap which results at the beginning and the end of each run of pipe when the present known methods are employed. It is understood that the threading needle is also admirably adapted for threading metal strip of all kinds through a furnace and other treating and handling devices used in the manufacture of treated metal strip of all kinds produced by the continuous mill process. I contemplate using my threading needle in connection with the manufacture of tin plate, zinc-coated plate, and other coated plate or strip where manufactured by the continuous process of production. The strip, whatever its nature, can be threaded through the furnace and associated treating apparatus with a minimum of labor and without exposing the workmen to the terrific heat or to the danger of becoming injured by the movement of the strip through the apparatus. Through the saving effected by the speedier introduction of the strip with less labor and the great reduction in waste scrap resulting, substantial economies in production after shut-downs can be effected.

The process and apparatus herein disclosed is also more flexible in operation, less skill and attention being required to operate the furnaces. In present processes of welding pipe, for example, the temperature must be held at 1400° or 1500° C. to work successfully. Delicate temperature controls and careful supervision are therefore necessary. Often much pipe must be thrown away as scrap because temperatures have not been sufficiently controlled at the furnace. In my process such accurate temperature controls are not necessary. The sheets will weld successfully if they possess a temperature when they leave the furnace of from 1100° to 1400° C. Thus welding can be carried on by my process at a lower furnace temperature, affording a considerable saving in fuel. My process has a wide production range and can successfully weld pipe at the rate of from 15 feet to 800 feet per minute. However, a speed of 300 to 400 feet per minute is generally the practical range for high production speed due to the fact that with higher speeds the heating furnaces and tunnels must be so long as to become cumbersome to handle.

It is also seen that by the provision of duplicate auxiliary rolls and devices production can continue at top speed without scrap or waste resulting when rolls have to be cleaned, repaired, or replaced, or pipe of another size is to be run. Thus full efficiency from the furnaces, cooling apparatus and pipe-forming apparatus is attained, resulting in further substantial economies in production as compared with other known processes.

One of the most important objectives realized by the use of my process and apparatus is the production of a superior grade of pipe through the perfect welding at the seam. The formation of iron oxide scale which results from present processes exposes the metal to corrosive influences and prevents actual adhesion or bonding of the ferrous atoms or molecules at the point in the seam where the scale exists. Thus through the entire section of the weld there is only a partial cohesion of the metal molecules and the pipe is correspondingly weakened. Welded pipe as now made will invariably burst at the seam. The difficulties arising through the obnoxious formation of oxide scale at the seam joint and around the exposed surface of the pipe during its formations are substantially eliminated. The seam-weld produced with my process and apparatus has been found to be substantially as strong as or even stronger than the body of the pipe itself. Thus lighter pipe produced by my process can be used where a heavier pipe formed with an imperfect seam produced by present processes must be used. The pipe produced by my process is more uniform in crystalline texture and is a more reliable pipe for all uses because of its freedom from oxide scale buried in the seam and its freedom from scale weaknesses around the body thereof. The pipe produced by my process is more durable because of its freedom from iron oxide scale which is subject to corrosive attack from materials passing through or surrounding the same. The seam as well as the pipe body is substantially free from pits and irregularities which are so often present in pipe manufactured by known processes.

It is understood that the weld-forming process and apparatus herein described is admirably adapted for many welding uses other than the seam-welding of ferrous pipe. The process and apparatus herein described may be used also in lap or butt welding ferrous sheets, strip, bars, tubes, and shapes of many and varied forms, which will be apparent to workmen skilled in the art.

While certain novel features of the invention have been disclosed and are pointed out in the annexed claims, it will be understood that various omissions, substitutions and changes may be made by those skilled in the art without departing from the spirit of the invention.

What is claimed is:

1. The process of welding ferrous metals including, heating the metal to a welding temperature, applying to the parts to be welded a mixture comprising 80% to 95% oxygen by volume and 5% to 20% by volume of an oxygen-modifying component such as hydrogen and/or nitrogen so as to produce a modified oxide material removable in a reducing atmosphere, applying a reducing atmosphere so as to remove said modified oxide of iron material leaving substantially the free metal exposed, and thereafter pressing the parts into welding contact so as to form a homogeneous merger between the metal of the parts in contact.

2. The process of welding ferrous metals which includes, heating the metal to a temperature approximating a welding temperature, applying to the parts to be welded a mixture comprising 80% to 95% by volume of oxygen and 5% to 20% by volume of foreign material such as water or steam so as to produce a modified oxide scale removable in a reducing atmosphere, applying a reducing atmosphere to the metal parts to be welded, and pressing the parts to be welded into contact.

3. The process of welding ferrous metals which includes, heating the metal to a temperature approximately 1200° C., applying to the parts to be welded a mixture comprising approximately 92% by volume of oxygen, approximately 6% by volume of hydrogen and approximately 2% by volume of nitrogen so as to produce a modified oxide coating on the metal which is removable in a reducing atmosphere, applying a reducing atmosphere to the metal parts to be welded, and pressing the parts to be welded into contact.

4. The process of welding ferrous metals which includes, heating the metal to a temperature of from 1100° to 1500° C., applying to the parts to be welded a mixture comprising approximately 85% to 95% by volume of oxygen and a modifying agent such as hydrogen or nitrogen or a mixture of both operative to combine with said metal to form a modified oxide coating reducible in a reducing atmosphere, applying a reducing atmosphere to the metal parts to be welded, and pressing the parts to be welded into contact.

5. The process of welding ferrous metals including, heating the metal to a temperature of from 1100° to 1500° C., applying to the parts to be welded a material including a major proportion of oxygen and a modifying agent adapted to produce with said oxygen a modified oxide material reducible in a reducing atmosphere, moving the metal out from the influence of said modified oxygen mixture into a neutral atmosphere, thereafter subjecting the parts to be welded to a reducing atmosphere to remove the modified oxide material and leave substantially the pure metal exposed, and thereafter pressing the parts to be welded into welding contact.

WARD HOLT BROADFIELD.